(12) United States Patent
Lee et al.

(10) Patent No.: US 9,978,102 B2
(45) Date of Patent: May 22, 2018

(54) APPARATUS AND METHOD FOR TRADE AGGREGATION OF TRADE ALLOCATIONS AND SETTLEMENTS

(71) Applicant: ITG SOFTWARE SOLUTIONS, INC., Culver City, CA (US)

(72) Inventors: Ronald D. Lee, Merrimack, NH (US); Mervin C. Newell, Victorville, CA (US); Scott H. Kurland, New York, NY (US); Ian P. L. Hoenisch, Windham, NH (US); James B. Weiner, Newington, NH (US); Gerald B. Drayer, Lake Grove, NY (US); Robert L. Sher, New York, NY (US)

(73) Assignee: ITG SOFTWARE SOLUTIONS, INC., Culver City, CA (US)

( * ) Notice: Subject to any disclaimer, the term of this patent is extended or adjusted under 35 U.S.C. 154(b) by 631 days.

(21) Appl. No.: 14/462,431

(22) Filed: Aug. 18, 2014

(65) Prior Publication Data

US 2015/0178839 A1    Jun. 25, 2015

Related U.S. Application Data

(62) Division of application No. 12/825,148, filed on Jun. 28, 2010, now Pat. No. 8,812,383, which is a division
(Continued)

(30) Foreign Application Priority Data

Jun. 30, 2009    (WO) ................ PCT/US2009/049199

(51) Int. Cl.
*G06Q 40/00*    (2012.01)
*G06Q 40/04*    (2012.01)
*G06Q 40/02*    (2012.01)

(52) U.S. Cl.
CPC ............. *G06Q 40/04* (2013.01); *G06Q 40/00* (2013.01); *G06Q 40/02* (2013.01)

(58) Field of Classification Search
CPC ......... G06Q 40/00; G06Q 40/02; G06F 17/60
(Continued)

(56) References Cited

U.S. PATENT DOCUMENTS 8,005,926 B2    8/2011    Harkin et al.
2002/0087455 A1*  7/2002    Tsagarakis ........... G06Q 20/382
                                                                       705/37
(Continued)

OTHER PUBLICATIONS

Johannes Prix et al., Algorithmic Trading Patterns in Xetra Orders, Dec. 2007, The European Journal of Finance, vol. 13, 718-737 (Year: 2007).*
(Continued)

*Primary Examiner* — I Jung Liu
(74) *Attorney, Agent, or Firm* — Prince Lobel Tye, LLP

(57) ABSTRACT

A post-trade aggregation system includes an allocation middleware interface, which interacts with data interface to allocate and settle trades. An order management system receives a trade order on behalf of a customer and causes apportionment of the trade into a plurality of smaller orders to be transmitted to a plurality of order destinations directly (e.g. via the FIX protocol). The post-trade aggregation system includes an allocation middleware interface which receives the individual trade executions from the plurality of order destination and compresses them into a single average-priced block. The allocation middleware interface then transmits the single average-priced block to be cleared by a designated clearing agent and allocates the single average-priced block into one or more custodian accounts.

6 Claims, 8 Drawing Sheets

Related U.S. Application Data of application No. 12/165,322, filed on Jun. 30, 2008, now Pat. No. 8,341,067.

(58) Field of Classification Search
USPC .................................................. 705/35, 37
See application file for complete search history.

(56) References Cited

U.S. PATENT DOCUMENTS

| | | | |
|---|---|---|---|
| 2003/0050879 A1* | 3/2003 | Rosen | G06Q 40/00 705/35 |
| 2005/0102220 A1 | 5/2005 | Stackpole | |
| 2006/0026090 A1* | 2/2006 | Balabon | G06Q 40/04 705/37 |

OTHER PUBLICATIONS

Chapman, P., "Algorithmic Aggregator," Nov. 30, 2004, Tradersmagazine, Jun. 3, 2009, /www.tradersmagazine.com/issues/20041130/2090-1.html>.

* cited by examiner

APPARATUS AND METHOD FOR TRADE AGGREGATION OF TRADE ALLOCATIONS AND SETTLEMENTS

CROSS-REFERENCE TO RELATED APPLICATIONS

This application is a divisional and claims the benefit of priority to U.S. patent application Ser. No. 12/825,148 filed Jun. 28, 2010, which is a continuation of and claims the benefit of priority to U.S. patent application Ser. No. 12/165,322, filed Jun. 30, 2008, now U.S. Pat. No. 8,341,067, issued Dec. 25, 2012, which claims the benefit of priority from International Application No. PCT/US09/49199, filed Jun. 30, 2009, the entire contents of each of which are hereby incorporated by reference.

BACKGROUND OF THE INVENTION

The present invention relates generally to electronic trading of financial instruments and, more particularly, to an improved system and method for post-trade aggregation processing of executed instruments.

Customers often execute trades with multiple brokers for a number of reasons, such as to find liquidity, adhere to best execution, and reduce market impact. Such customers also trade on behalf of many custodial customer accounts, resulting in numerous trade allocations on any given trading day. With existing securities order processing and routing systems, such trade allocations may incur substantial custodial "per-trade" ticket fees, which the custodial banks charge in order to process, settle, and affirm executions that come in from the various brokers who execute the trades.

Heretofore, the process of trade compression has been limited to executions done on exchanges and electronic communication networks (ECNs) where the brokerage firm itself is a direct member of that exchange or ECN. Additionally, existing aggregation processing systems also incorporate order management systems, thereby requiring customers who want to reduce the "per-trade" ticket fees through post-trade aggregation to either purchase an entirely new system or pay the additional ticket costs. Thus, there exists a need for a system compatible with the customers' existing technologies which allows them to compress trades executed across multiple brokers or order destinations internally. The present disclosure contemplates a new and improved order aggregation and clearing system, for securities and other financial instruments which overcomes the above-referenced limitations and others.

SUMMARY OF THE INVENTION

In one aspect, a customer's order management system sends and receives a trade order from the customer to a financial instrument trading system. The financial instrument trading system includes an order staging and optimization interface. The order management system, and/or order staging and optimization interface, includes means for apportioning the order into a plurality of smaller orders. The order management system and/or staging and optimization interface then communicates the plurality of smaller orders to a plurality of order destinations. The individual executions or fills from the plurality of order destinations are delivered back to the order management system and then to the allocation middleware where the individual executions are compressed into a single average-priced block for clearing on an aggregated basis.

In a further aspect, an apparatus includes a computer-based information handling system having a storage device storing instructions to be executed by the computer-based information handling system to receive a plurality of individual financial instrument trade executions from the plurality of order destinations, combine the plurality of individual financial instrument trade executions into a single average-priced block, and deliver the single average-priced block and allocation instructions to a clearing agent for delivery to custodial agents.

In another aspect, a method for trading financial instruments is provided wherein a trade order is prepared and apportioned into a plurality of smaller trade orders. The plurality of smaller trade orders are communicated to a plurality of order destinations. For each of the plurality of smaller trade orders, the individual trade order executions are received from the plurality of order destinations, combined into a single large average-priced block, and are delivered to a post-trade aggregation system for combining the individual trade order executions into a single average-priced block and clearing the individual trade order executions on an aggregated basis.

One advantage of the present disclosure resides in the streamlining of workflow and technology. For example, customers, trading firms, and executing brokers can use their existing management systems for placing trade orders in combination with the post trade aggregation system and method of the present disclosure, which automates the clearing, delivery, and billing processes, thereby reducing the costs associated with manual processing and human-error reconciliation.

Another advantage of the present disclosure resides in the ability to facilitate trade compression across multiple executing brokers, while avoiding the need for customers to incur higher custodial costs associated with executing trades across multiple brokers. Utilizing multiple brokers and execution venues may increase liquidity and minimize market impact, which in turn can affect portfolio performance for the customer's end clients.

Another advantage of the present disclosure is that it allows the customer to seek best execution of a trade without being hindered by higher costs. The present invention also allows the customer to cope with the fragmentation of the market and trade with more varied destinations by reducing the costs of doing so.

Yet another advantage of the present disclosure is that it may result in lower costs for customers for a number of reasons, including fewer custodial tickets, fewer allocation and instruction messaging costs, fewer back-office trade-breaks, and fewer personnel required to deal with trading issues.

In a further aspect, the present disclosure provides cost savings for sell-side executing brokers since they do not have to individually allocate, deliver, and affirm trades directly to individual custodial accounts and trading firms. Business workflow is improved when brokers deliver and clear trades against one central clearing entity directly, rather than individually with multiple institutional trading firms.

Other benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes

DETAILED DESCRIPTION OF THE PREFERRED EMBODIMENTS

The present disclosure provides an improved system and method of post-trade aggregation of financial instruments through which an customer can clear, allocate, accept delivery, and affirm trades, on a compressed, average priced basis. Although described herein primarily by way of reference to financial securities or equities, it will be recognized that the present invention is amenable to all manner of financial instrument trading including without limitation domestic and international trading of stocks, bonds, options, futures, funds, and other tradable tangible and intangible commodities.

Figure 1:
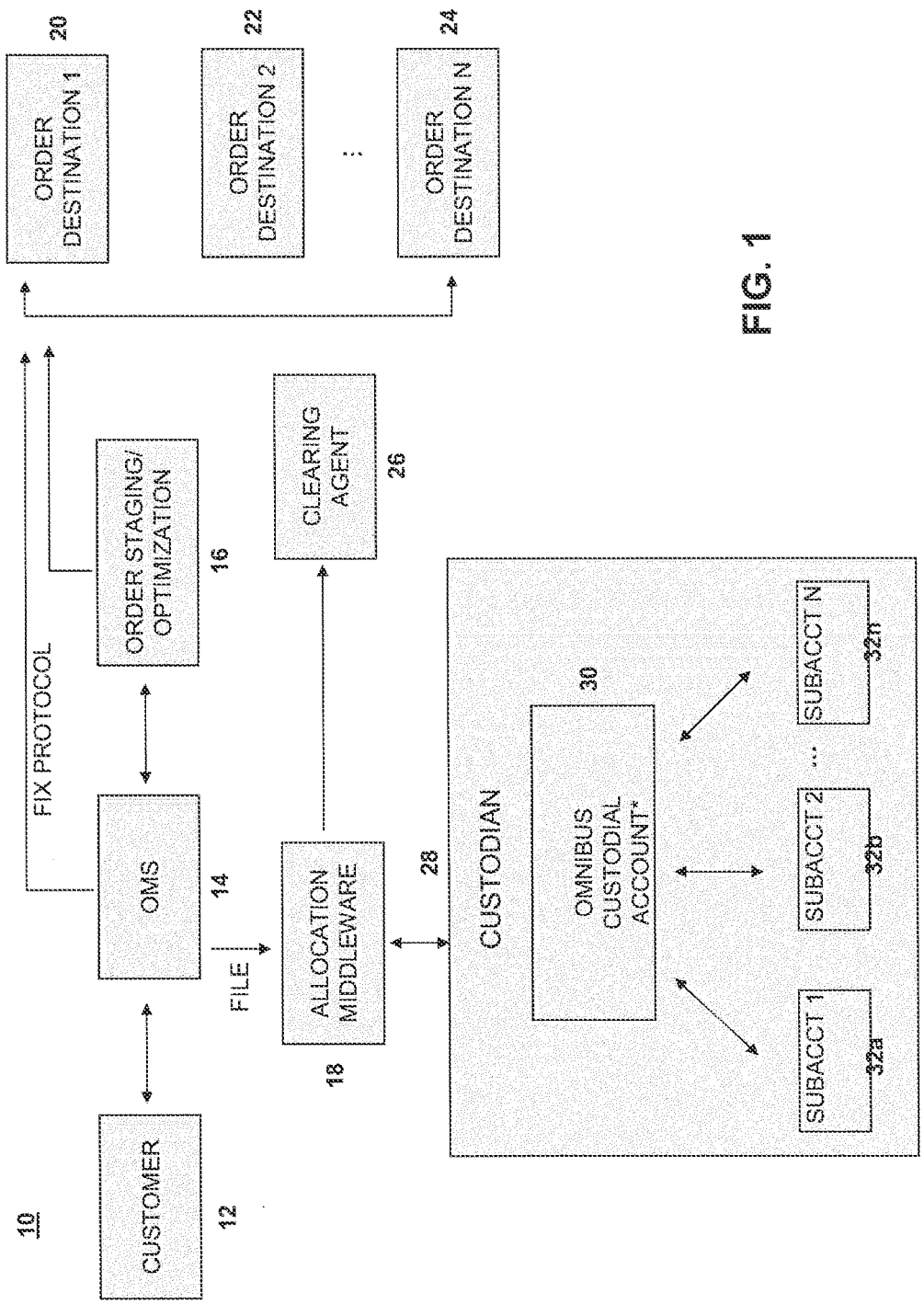
FIG. 1 is a block diagram of an equities trading system in accordance with an exemplary embodiment of the present invention.

Referring now to FIG. 1, there is shown a block diagram illustrating a trading system 10 for the clearing of securities trading orders, and for the allocation and delivery of the respective shares, in accordance with an exemplary embodiment of the present invention.

As depicted in FIG. 1, the trading system 10 may be used by a customer 12, which may be, without limitation, a pension fund, mutual fund, investment manager, broker/dealer, hedge fund, or the like, and may be a customer that trades on behalf of multiple custodial accounts. The customer 12 is in communication with its order management system (OMS) 14, which may be hosted, for example, on a computer-based information handling system of the customer 12 or of a brokerage company that buys and sells securities on behalf of the customer 12. It will be recognized that the order management system 14 can be any type of buy-side trade allocation and settlement system, such as an execution management system (EMS), settlement system (SS), or other interface for placing orders directly with an executing broker, including proprietary or custom-built interfaces. The customer 12 may communicate securities trading orders to the OMS 14 of its institutional trading desk via a number of methods, including a telephone, a computer connected to the OMS 14 via the Internet or other communications network such as a local area network (LAN), wide area network (WAN), and so forth. The OMS 14 may be of a type that performs a number of functions, such as trade generation, order routing, and others. For ease of exposition, only a single customer 12 is shown. It will be recognized that there may be any number of customers.

An order staging system includes order staging and optimization software 16 which apportions a large order into a plurality of smaller orders with route destinations specified, which are sent to order destinations 20, 22, 24, etc. Three order destinations are depicted for ease of illustration, however, it will be recognized that there may be any number (N) of order destinations. Examples of order staging and optimization software 16 are generally known in the art. Alternatively, smaller orders with route destinations specified may be passed directly to the order destinations 20, 22, 24, etc., by the OMS 14, e.g., via the FIX protocol. Many customers already have extensive FIX connectivity in place between their order management system and executing brokers. The present development provides these customers with an independent post-trade aggregation processing system which is compatible with most customers' existing order management technologies.

The order destinations 20, 22, 24, etc., may be a physical exchange, electronic clearinghouse or exchange, market maker, electronic crossing network (ECN), algorithm desk, program desk, alternative trading system (ATS), or other means for matching buy and sell trades for securities or other financial instruments. The order staging and optimization software 16 routes the smaller orders to the appropriate destinations.

Figure 2:
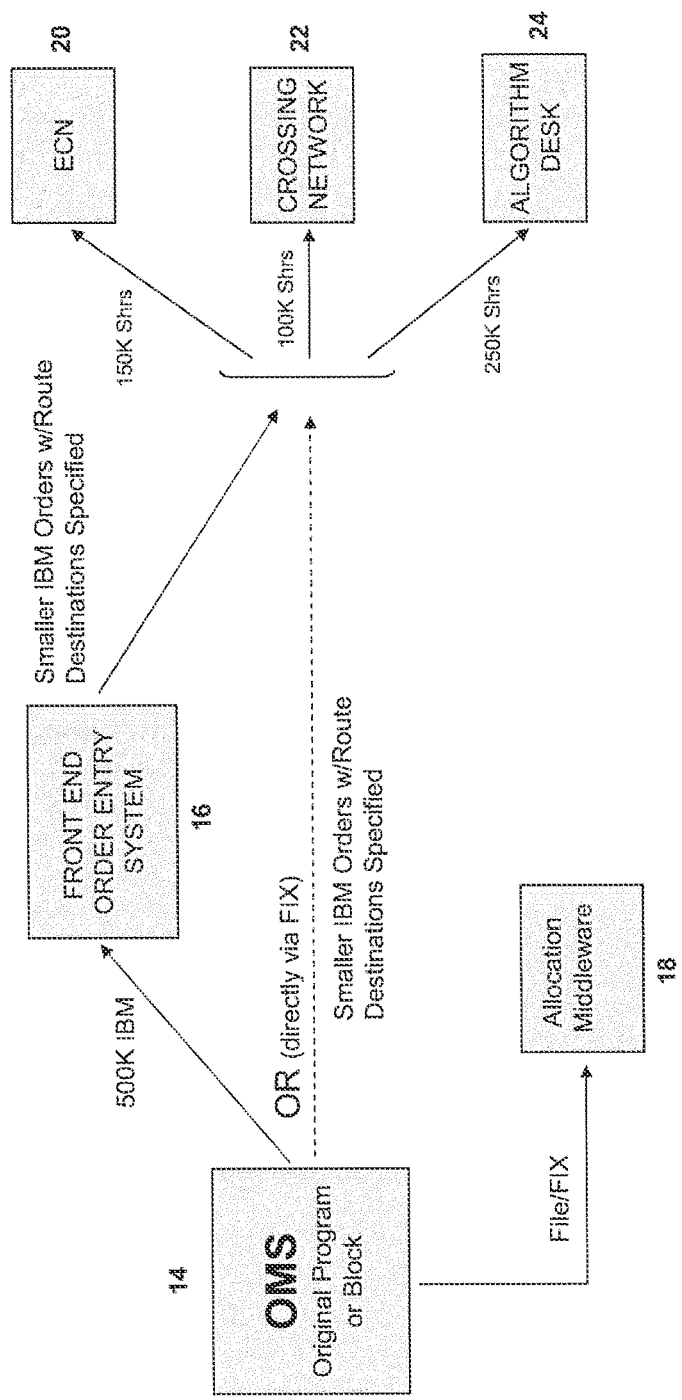
FIG. 2 is a flow diagram of order origination in accordance with an exemplary embodiment of the present invention.

With reference now to FIG. 2, and with continued reference to FIG. 1, a flow diagram appears outlining the order origination process using the order staging and optimization software in accordance with the present embodiment. In the depicted non-limiting example, the customer has an order to execute a trade of 500,000 shares of IBM. The initial order is divided into three smaller orders, either via order staging and optimization software 16, or, is apportioned into three smaller orders directly by OMS 14 and communicated to the order destinations 20, 22, 24, etc., with route destinations specified, e.g., via the FIX protocol or other like protocol. In the example depicted in FIG. 2, the original order of 500,000 shares of IBM is divided into three smaller orders of 150,000, 100,000, and 250,000 orders, which are routed to the order destinations 20, 22, and 24, respectively.

Figure 3:
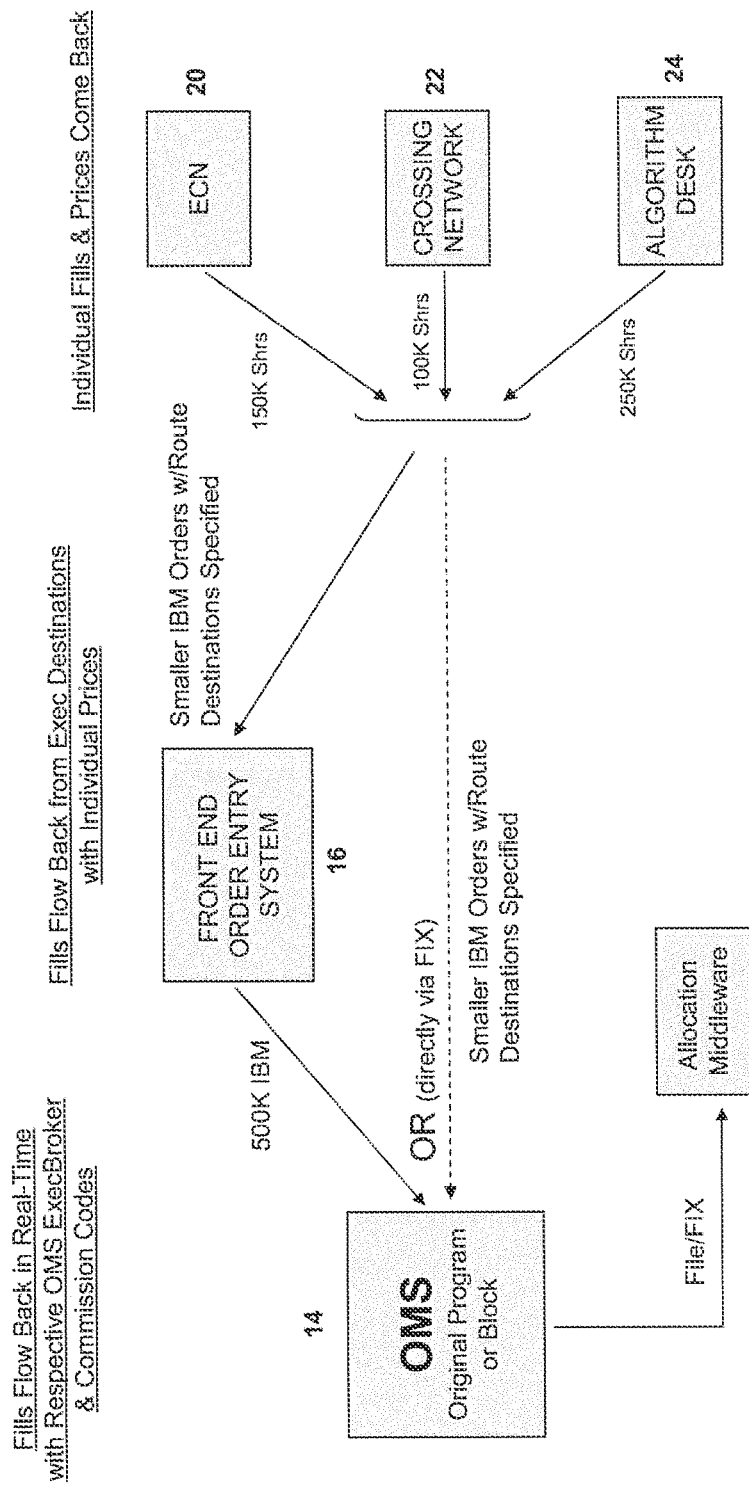
FIG. 3 is a flow diagram outlining order execution in accordance with an exemplary embodiment of the present invention.

The destination brokers 20, 22, and 24 execute the trades in real time throughout the day. Referring now to FIG. 3, with continued reference to FIG. 1, there is shown a flow diagram outlining the executions of the exemplary order illustrated in FIG. 2. The individual fills with individual prices come back from the destinations 20, 22, and 24 to the order staging and optimization software 16. The fills flow back in real time to the OMS 14 from the respective brokers and order destinations.

At the end of each trading day, the executing destination brokers clear the executions, on a block or individual basis, back to the executing broker's designated clearing firm 26 on a broker-to-broker or firm-to-firm basis. The broker-to-broker end-of-day clearance process may be accomplished by a number of methods, including but not limited to correspondent flip, two-sided ACT lock-in, or the like, as would be understood by persons skilled in the art.

Figure 4:
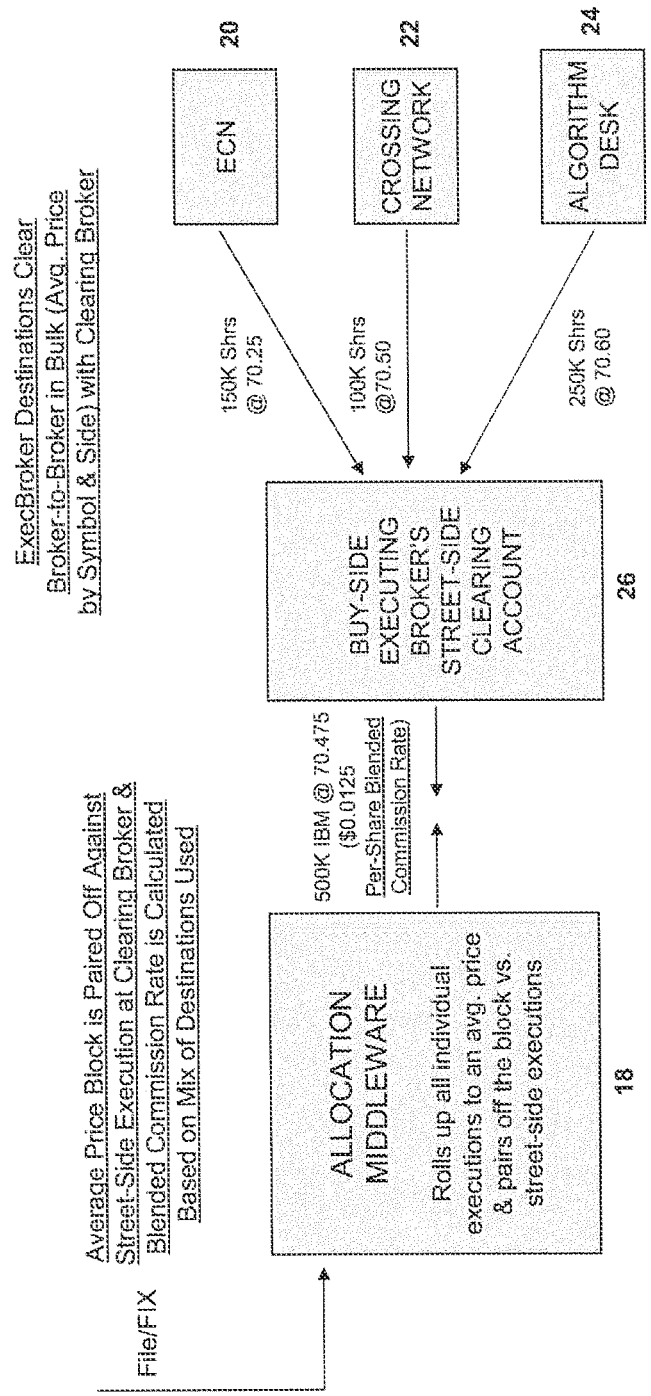
FIG. 4 is a flow diagram illustrating street-side clearing in accordance with an exemplary embodiment of the present invention.

As best seen in FIG. 4, which illustrates the street-side, average-priced clearing process in accordance with the present embodiment, the plurality of smaller trade orders clear in bulk (average price by symbol and side) with the buy-side executing broker's designated clearing firm 26.

The allocation middleware 18 compresses all individual executions from the destinations used based on the trade allocation output data from each broker and execution venue used. The individual executions are then compressed to a single volume-weighted, average-priced block (e.g., 500,000 shares of IBM in the depicted embodiment) based on the category or categories designated by the customer. The categories can be selected from common security, side, block ID, account, etc., or a combination thereof. The average-priced block is then paired off against the street-side executions at the designated clearing firm. A blended commission rate may then be calculated based on the mix of order destinations used.

It will be recognized that the allocation middleware 18 and other functional modules as described herein are preferably hosted on a computer based information handling system of the buy-side executing broker and may be implemented in software, hardware, firmware, or combinations thereof, and may employ dedicated processing circuitry or may share common hardware.

The destination brokers or market centers deliver trade executions back to the buy-side executing broker's central street-side clearing account 26 on a broker-to-broker basis at the end of each trading day. The allocation middleware 18 further compresses the trades into average price tickets for central allocation and delivery out to the custodian 28. Since the destination brokers do not allocate and deliver to the custodians directly (e.g., via OASYS), they may not know where the trades are ultimately settling.

A custodian entity 28 holds the securities on behalf of the customer 12. The average-priced block of shares is then allocated and delivered to the appropriate custodial accounts, 32a, 32b, up to 32n of the customer 12. As depicted in FIG. 1, the accounts 32a-32n may be subaccounts under an omnibus custodial account 30 of the customer 12. In an alternative embodiment to FIG. 1, the allocated average-priced block of shares may be delivered directly to the custodial accounts, 32a, 32b, up to 32n, from the allocation middleware 18. The subaccounts may be, for example, funds, pension funds, or other accounts managed by the customer 12. Three subaccounts are depicted in FIG. 1 for ease of illustration, however, it will be recognized that there may be any number (n) of subaccounts.

Figure 5:
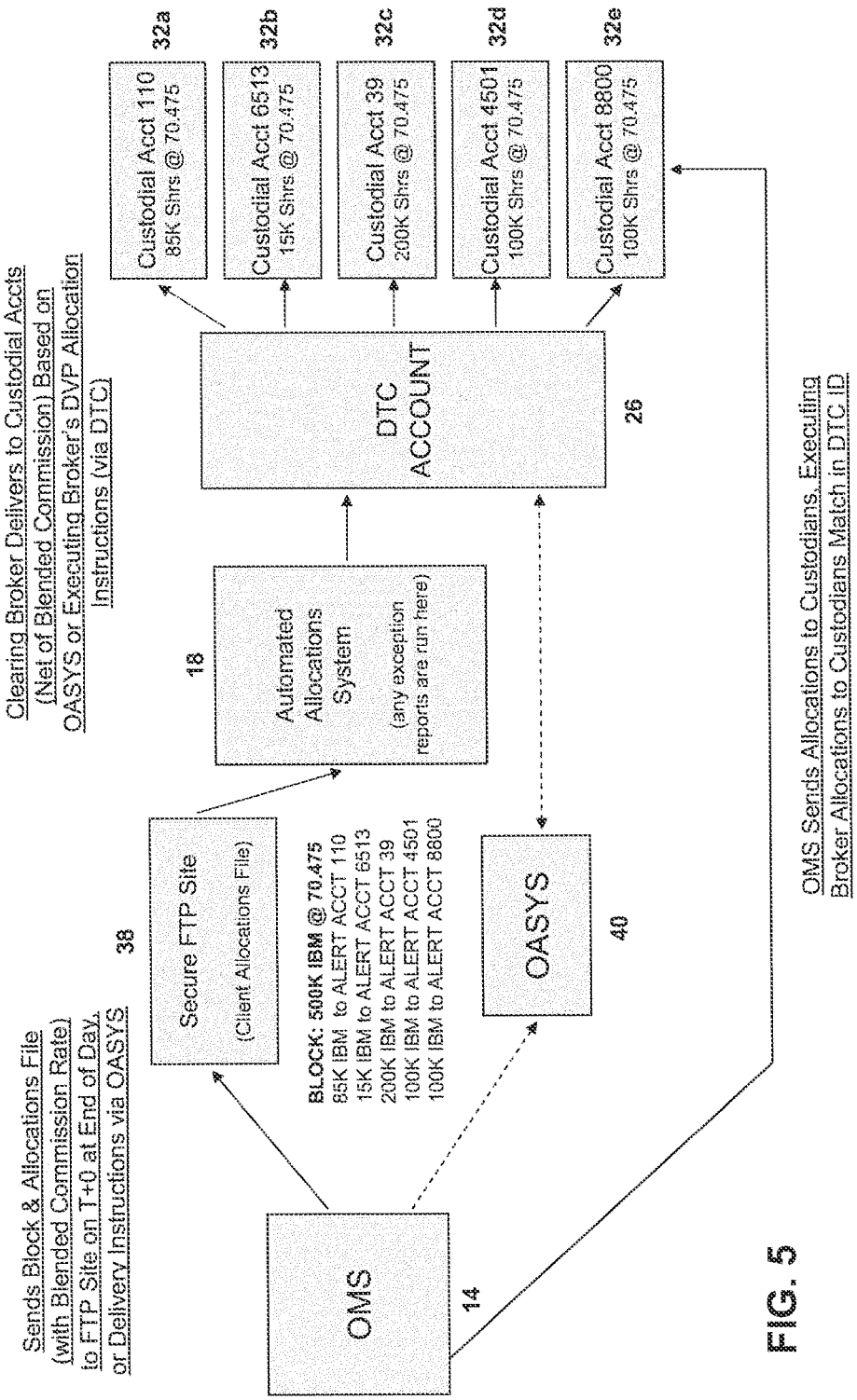
FIG. 5 is a flow diagram illustrating allocation and delivery in accordance with an exemplary embodiment of the present invention.
Figure 6:
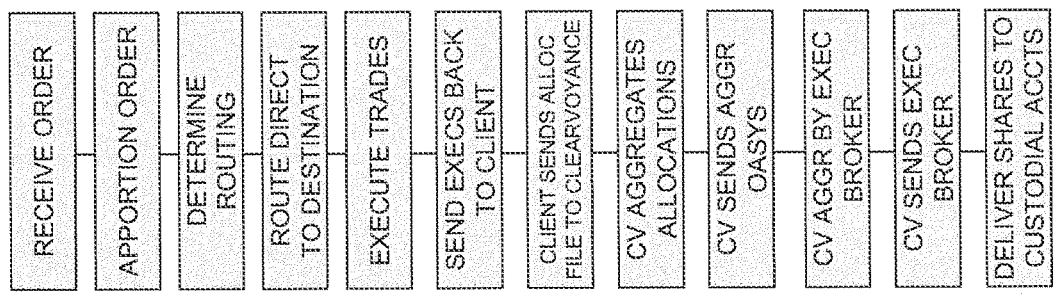
FIG. 6 is a flow diagram outlining an exemplary method in accordance with the present invention.

As best seen in FIG. 5, and referring to the example illustrated in FIGS. 2 through 4, the OMS 14 sends the allocations to the custodian 26. The OMS 14 also sends block and allocation information to the middleware 18, e.g., via a secure server 38. The middleware 18 then sends allocation instructions to the designated clearing agent or broker 26, e.g., via its depository trust company (DTC). The OMS 14 allocation information and buy-side executing broker delivery versus payment (DVP) allocation instructions (or journal entry where the trade clears locally, i.e., at the same institution that executed the trade) match in the DTC ID. The clearing agent 26 then delivers the shares to the various subaccounts based on the allocation instructions. It will be recognized that alternative allocation programs or methods 40, such as OASYS, fixed instructions/default, percent based, fix message, file based, API, manual, and others, may be used to communicate the allocation instructions from OMS 14 to the clearing firm 26 and allocation middleware 18. In the depicted embodiment, the middleware 18 compresses the trades into a single trade of 500,000 shares of IBM at an average price of $70.475, resulting in a substantial reduction in custodial ticket and other costs for the customer 12. A flow chart outlining the above-described process appears in FIG. 6.

Figure 7:
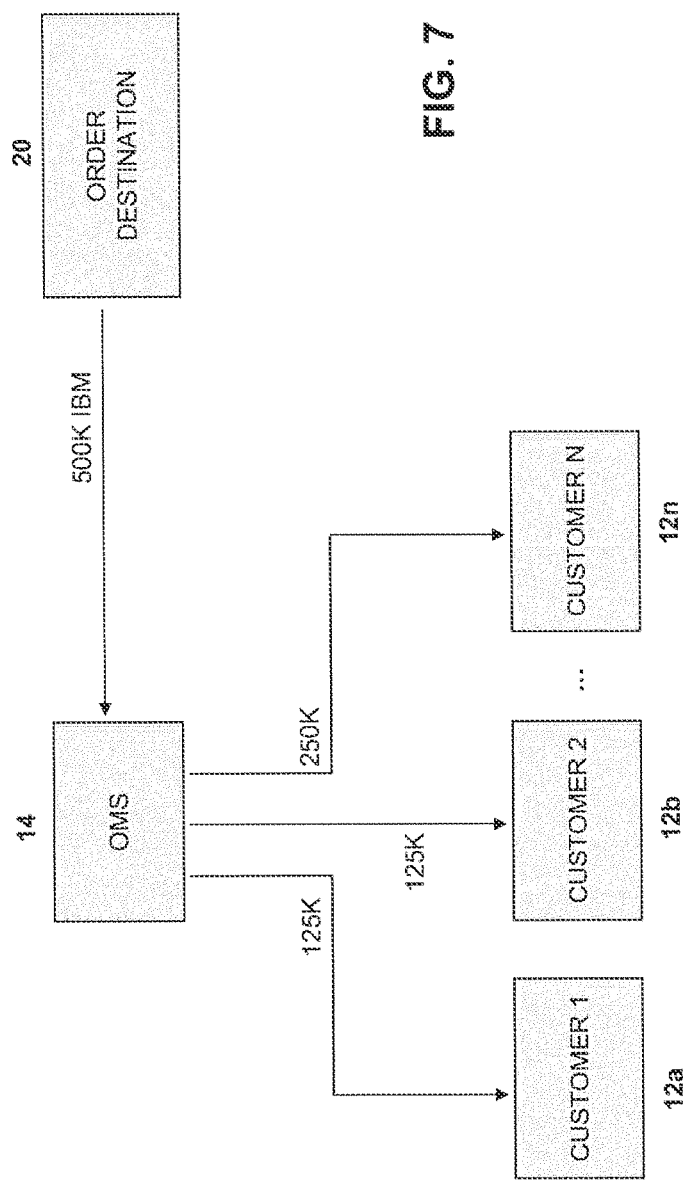
FIG. 7 is a flow diagram illustrating a further embodiment providing trade compression for all trades in a single security for a given destination broker, with one set of allocations for that security being delivered out to multiple customer accounts.

Referring now to FIG. 7, a further aspect of the post-trade aggregation processing system and method in accordance with the present embodiment optionally allows destination brokers to roll up and average by price all trades in a given security for multiple (up to any number, N) customers 20a, 20b, up to 20n. The trades flow back to the allocation middleware 18 in a single ticket, thereby reducing the probability of errors and resulting in substantial cost savings, such as ticket, labor, trade breaks, research, labor costs, and so forth.

Figure 8:
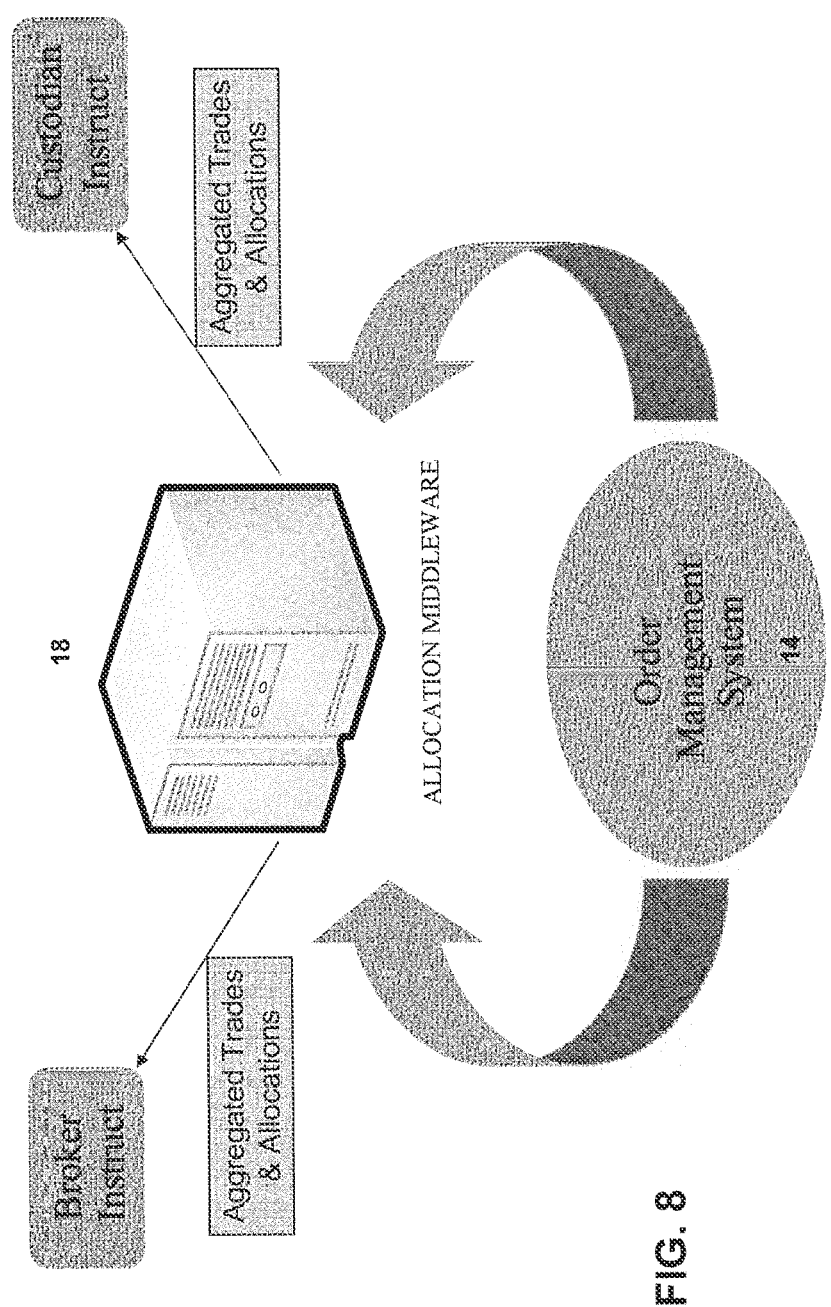
FIG. 8 is a flow diagram illustrating the post-trade aggregation system and process in accordance with the present invention.

As depicted in FIG. 8, the order management system 14 provides allocation information to allocation middleware 18, which in turn provides instructions to the clearing agent 26 and custodian 28. The allocation middleware 18 can be customized to each customer's desired specifications. Such customizations may include, for example, type of data interface, aggregation scheduling, designation of brokers, execution services, clearing firms, clearing firm settings, allocation rules, market configuration, and asset configuration. This customization enables the post-trade aggregation system to reduce costs for customers by working with their current technologies and providing an aggregation of trades to reduce post trade clearing costs.

In certain embodiments, the allocation middleware 18 can be programmed to run in simulation mode to perform an aggregation allocation without actually purchasing and going through the steps of clearing and settlement. In this manner, customers can determine the costs associated with making certain trades without actually performing the trade. In addition, the allocation middleware 18 may have reporting and research interfaces added to the system. A reporting interface may be provided to enable the user to create various reports such as aggregation savings reports, clearing impact reports, order fragmentation reports, transaction cost analysis reports, peer analysis reports, STP and fail rate reports, error and trade break reports, and others. A research interface may be provided to enable the user to perform real-time and historical trade research to obtain such information as block ID, allocation ID, trade date, trade range, security ID, ticker, name, account, broker, broker code, status, comparisons of original records and aggregation records, and so forth.

Certain embodiments of the invention may be implemented as sets of instructions resident in the memory of a computer-based information handling system or other storage device of one or more computer systems until required by the computer system. The set of instructions may be stored in an electronic or computer readable memory, such as a main memory, hard disk drive, or in a removable memory such as an optical disc, a magnetic media, and so forth. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically, or holographically so that the medium carries computer readable information.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A post-trade aggregation system, comprising:
an allocation computer configured to:
receive a plurality of individual electronic financial instrument trade order executions from a plurality of order destinations, each of said plurality of individual electronic financial instrument trade order executions clearing broker-to-broker with a designated clearing agent;
compress the plurality of individual electronic financial instrument trade order executions from said plurality of order destinations into an average-priced block; and
allocate the average-priced block among a plurality of custodial accounts based on received allocation information;
wherein said plurality of individual electronic financial instrument trade order executions are received from one or more data interface systems selected from an order management system, an execution management system, and a settlement system;
wherein said plurality of individual electronic financial instrument trade order executions are received via an electronic transmission protocol.

2. The post-trade aggregation system of claim 1, wherein wherein said plurality of individual electronic financial instrument trade order executions are received in a flat computer file.

3. The post-trade aggregation system of claim 1, wherein said electronic transmission protocol is a Financial Information eXchange (FIX) protocol.

4. A method of electronically trading and clearing a financial instrument, comprising:
preparing an electronic trade order;
electronically apportioning the electronic trade order into a plurality of smaller electronic trade orders;
electronically communicating the plurality of smaller electronic trade orders among a plurality of electronic order destinations;
for each of said plurality of smaller electronic trade orders, receiving individual electronic trade order execution messages from the electronic order destination of said plurality of electronic order destinations; and
transmitting the individual electronic trade order executions from said messages to a post-trade aggregation system;
at said post aggregation system, compressing the received individual trade order executions from the plurality of order destinations into a single average-priced block;
clearing each of the smaller electronic trade orders broker-to-broker with a designated clearing agent;
electronically communicating allocation information for allocating said single average-priced block to said designated clearing agent;
transmitting said single average-priced block to one or more custodial investment accounts in accordance with the allocation information;
wherein said individual electronic trade order execution messages are received from a data interface system selected from an order management system, an execution management system, and a settlement system;
wherein of individual electronic trade order execution messages are received via an electronic transmission protocol.

5. The method of claim 4,
wherein said individual electronic trade order execution messages are received from the data interface in a flat file.

6. The method of claim 4, wherein said electronic transmission protocol is a Financial Instrument eXchange (FIX) protocol.

* * * * *